MAKING DIMETHYLOL PROPANE

Joseph A. Wyler, Allentown, Pa., assignor to Trojan Powder Company, a corporation of New York No Drawing. Application November 6, 1953, Serial No. 390,749

3 Claims. (Cl. 260—635)

This invention relates to a process for the manufacture of dimethylol propane. The overall reaction involved is the conventional one represented by the following equation:

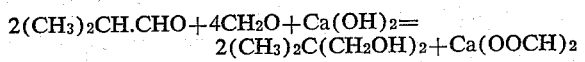

According to this reaction, 72.1 parts by weight of isobutyraldehyde will produce 104.1 parts of dimethylol propane.

In carrying out this condensation, however, various difficulties are encountered. Isobutyraldehyde in contact with alkalies differs from acetaldehyde, as in not undergoing aldolization readily with itself; also the isobutyraldehyde has a strong tendency to undergo the Cannizzarro type reaction. In other words, the isobutyraldehyde, in contact with alkali present in the condensation reaction gives sodium isobutyrate and hydrogen, thus

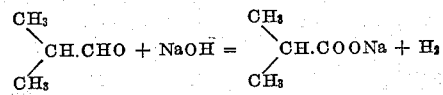

This formation of isobutyrate represents a loss of isobutyraldehyde which is no longer available for conversion to dimethylol propane.

Because of the difficulties involved in substituting isobutyraldehyde for acetaldehyde in condensation with formaldehyde, various expedients have been proposed to improve the reaction when isobutyraldehyde is used. Thus, there have been used specific temperature ranges for the reaction, co-solvents have been used for the formaldehyde and isobutyraldehyde so as to increase the concentration of the isobutyraldehyde that may be dissolved in the aqueous formaldehyde, and special agents such as dichlormethane have been introduced in admixture with water and alkali.

On the theory that the formation of the isobutyrate, in accordance with the second reaction given above, is the cause of a large decrease in yield of dimethylol propane from the reaction between formaldehyde and isobutyraldehyde in contact with alkali, I have studied the effect of maintaining the concentration of unreacted isobutyraldehyde at all times at a very low level, so as to minimize the concentration of it available for the undesired Cannizzarro reaction. I have discovered that maintaining the isobutyraldehyde concentration at a level below 1% by weigt of the reaction mixture avoids formation of excessive amounts of the isobutyrate and gives yields of the desired dimethylol propane in excess of 90% of theory.

Briefly stated, my invention comprises the interaction of formaldehyde and isobutyraldehyde in aqueous solution and in contact with an alkali, the concentration of free or unreacted isobutyraldehyde being maintained at a level below 1% of the weight of the whole mixture until the reaction is substantially complete, the pH of the reaction mixture being maintained at all times on the alkaline side of neutrality but not above pH 13.

As to materials used, I know of no aldehyde which may be substituted for isobutyraldehyde with the same favorable effect on yield which I obtain by operating under the conditions stated, so as to decrease the formation of a salt of the acid corresponding to the aldehyde.

The formaldehyde may be used in any one of its conventional forms but, when reacting with the isobutyraldehyde, must be in aqueous solution. Examples of such aqueous solutions are those containing 10%–40% of formaldehyde.

Any one of the water soluble metal alkalies which are conventionally employed in making pentaerythritol by reaction of formaldehyde with acetaldehyde may be used to provide the necessary pH in the present reaction. Examples of such alkalies are calcium hydroxide, which is sufficiently soluble in water, satisfactory in operation, and the lowest in cost, and sodium and potassium hydroxides and carbonates.

As to proportions, the theoretical molar ratios are indicated in the reaction first written above. The alkali used is in moderate excess so that the pH remains alkaline up to the very end of the reaction. The alkali is introduced gradually into the aqueous formaldehyde. The introduction is begun a few minutes before the first of the isobutyraldehyde is added and stirred in and is completed before the last of the isobutyraldehyde is added.

To obtain the desired high yields of dimethylol propane, the isobutyraldehyde must be added to the formaldehyde present in large proportion and the rate of addition of the isobutyraldehyde is substantially no faster than the rate at which the isobutyraldehyde is consumed in reaction with the formaldehyde. Thus I introduce the isobutyraldehyde into the whole of the formaldehyde at such a rate that the concentration of isobutyraldehyde remains below 1% of the reaction mixture, proportions here and elsewhere herein being expressed as parts by weight unless specifically stated to the contrary. In this manner, I avoid the side reaction to isobutyrate, which reaction is particularly rapid when isobutyraldehyde is present in large proportion in unreacted condition and in contact with the alkali.

This low proportion of unreacted isobutyraldehyde and the fact that all of the formaldehyde to be used is present in the reaction mixture from the first, shows that the ratio of formaldehyde to isobutyraldehyde is extremely high at least until the reaction is substantially completed, when the proportion of formaldehyde will be reduced. It may be calculated, on this basis, that the proportion of formaldehyde in a 10% solution, at the start, is 100 times the concentration of the maximum allowable free isobutyraldehyde, and this ratio increases when the formaldehyde is used in higher initial concentrations, such 20%–40%, for example. I obtain the best yields when the unreacted aldehydes are present in the ratio of at least 100 parts of formaldehyde to 1 part of isobutyraldehyde until the reaction is at least 90% complete.

With my low proportion of unreacted isobutyraldehyde to formaldehyde, the temperature of reaction should be within the range 20°–50° C. Below 20° C., the reaction is too slow and there is formed too much formaldehyde complex with the alkali. Above 50° C., on the other hand, syrupy by-products form in amount to decrease objectionably the yield of the desired dimethylol propane.

The invention will be further illustrated by description in connection with the following specific examples of the practice of it.

*Example 1*

144.12 parts isobutyraldehyde (99.54%, approx. 2 mols.) 10% solution of 329.8 parts formaldehyde (37.30%, 4.12 mols) in 910.5 parts water.
Slurry of 112 parts hydrated lime in 290 parts water.

The weight of formaldehyde used is equivalent to a 3% excess over the isobutyraldehyde.

The 10% formaldehyde solution is placed in a container provided with mechanical agitation and cooling means for regulating the temperature of the contents of the container.

The lime slurry is slowly introduced into the 10% formaldehyde solution over a period of 90 minutes, the pH being maintained during the reaction on the alkaline side but not above 13.

A few minutes after the lime addition has been started, the isobutyraldehyde is slowly added over a period of 2 hours, the temperature of the reaction being maintained at 30° C. or very slightly lower throughout the whole reaction. During the reaction the concentration of unreacted isobutyraldehyde did not exceed 0.15% of the weight of the reaction mixture, the analysis being made by the polarograph technique.

Within 3 hours from the start of the reaction, an iodine titration showed that the total aldehyde content of the reaction mixure was 0.29% calculated as formaldehyde, this test indicating that the reaction was essentially completed. The mixture was stirred until an end point of 0.23% as formaldehyde was obtained.

The reaction mixture was colorless and remained colorless throughout the succeeding processing.

The reaction mixture was filtered to remove excess lime, the latter washed with a little water and the washing added to the filtrate, the combined filtrate and washing acidified slightly with formic acid, and the dimethylol propane recovered by ethyl ether and acetone extraction.

The dimethylol propane was then in the form of fine, white, free-flowing crystals containing 0.18% of calcium formate and having a hydroxy content by analysis of 32.26% OH (theory 22.4%). The yield of dimethylol propane obtained was 94% of theory.

*Example 2*

The procedure of Example 1 is followed except that different concentrations of formaldehyde in the water solution initially used are employed. The results of such variations in the concentration of formaldehyde are shown in the following table.

| Example No. | Initial Formaldehyde Concentration, Percent | Yield, Percent of Theory |
|---|---|---|
| 2a | 10 | 88 |
| 2b | 30 | 88 |
| 2c | 40 | 82 |

*Example 3*

The procedure of Examples 1 or 2 is followed, except that the temperature was varied within the range 20°–50° that the temperature was varied within the range 20°–50° C. Good yields were obtained and the concentration of unreacted isobutyraldehyde was kept at all times below 0.2%.

*Example 4*

Using the procedure of Example 1 but allowing the temperature of reaction to rise to 50° C. after the reaction has proceeded for about 2 hours, I found that the reaction mixture turned brown and the yield dropped to 83% of theory.

In other preparations, I have established that (1) increasing the rate of addition of the isobutyraldehyde decreases the yield, (2) using an excess of formaldehyde does not appreciable improve the yield calculated from the isobutyraldehyde used, and (3) more rapid addition of the lime results in some loss of yield as compared for instance, to Example 1.

It will be understood that it is intended to cover all changes and modifications of the examples of the invention herein chosen for the purpose of illustration which do not constitute departures from the spirit and scope of the invention.

What I claim is:

1. In the process of making 2,2-dimethylolpropane by the interaction of formaldehyde with isobutyraldehyde in contact with a water-soluble metal alkali, the improvement which comprises introducing isobutyraldehyde into a 10%–40% aqueous solution of formaldehyde, at a temperature within the range about 20°–50° C., in total proportions of about 1 mol of isobutyraldehyde to 2 mols of formaldehyde and at a rate not substantially greater than the rate at which the isobutyraldehyde is consumed in the reaction and so as to maintain the proportion of unreacted isobutyraldehyde at no more than about 1% of the weight of unreacted formaldehyde until the reaction is at least 90% complete, and maintaining the temperature within the said range and introducing the said alkali in amount and at a rate to establish and keep the pH on the alkaline side of neutrality but below 13 until the reaction is substantially complete.

2. The process of claim 1 wherein said water-soluble metal alkali is introduced slowly into the aqueous solution of formaldehyde and the introduction of the alkali commences prior to introduction of any isobutyraldehyde and is completed prior to introduction of the last of the isobutyraldehyde.

3. The process of claim 1 wherein said water-soluble metal alkali is calcium hydroxide.

References Cited in the file of this patent
UNITED STATES PATENTS

| | | |
|---|---|---|
| 1,878,040 | Voss | Sept. 20, 1932 |
| 2,135,063 | Walker et al. | Nov. 1, 1938 |
| 2,372,602 | Owens | Mar. 27, 1945 |
| 2,400,724 | Walker | May 21, 1946 |
| 2,401,749 | Burghardt et al. | June 11, 1946 |

OTHER REFERENCES

Lucas et al.: "Principles & Practice in Organic Chemistry," Wiley & Sons, N. Y. 1949; pgs. 6–11.